US010197855B2

(12) United States Patent
Cho et al.

(10) Patent No.: US 10,197,855 B2
(45) Date of Patent: Feb. 5, 2019

(54) LIQUID CRYSTAL DISPLAY DEVICE

(71) Applicant: SAMSUNG DISPLAY CO., LTD., Yongin-si, Gyeonggi-do (KR)

(72) Inventors: Hyunmin Cho, Seoul (KR); Jonghyuk Kang, Suwon-si (KR); Jaebyung Park, Seoul (KR); Hyundeok Im, Seoul (KR); Jaewoong Kang, Jeonju-si (KR); Sungjin Hong, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 343 days.

(21) Appl. No.: 15/067,651

(22) Filed: Mar. 11, 2016

(65) Prior Publication Data
US 2016/0363818 A1  Dec. 15, 2016

(30) Foreign Application Priority Data
Jun. 10, 2015  (KR) .................... 10-2015-0081820

(51) Int. Cl.
*G02F 1/1335* (2006.01)
*G02F 1/1333* (2006.01)

(52) U.S. Cl.
CPC .. *G02F 1/133621* (2013.01); *G02F 1/133514* (2013.01); *G02F 1/133603* (2013.01); *G02F 1/133605* (2013.01); *G02F 1/133308* (2013.01); *G02F 2001/133314* (2013.01); *G02F 2001/133601* (2013.01); *G02F 2001/133613* (2013.01)

(58) Field of Classification Search
CPC ......... G02F 1/133602; G02F 1/133603; G02F 1/133605; G02F 2001/133613; G02F 1/133621; G02F 2001/133622; G02F 1/133608; G02F 1/133308; G02F 2001/133314; G02F 1/133514
See application file for complete search history.

(56) References Cited

U.S. PATENT DOCUMENTS

| 8,243,226 | B2* | 8/2012 | Kim | G02F 1/13336 349/108 |
| 8,643,265 | B2 | 2/2014 | Park et al. | |
| 9,316,385 | B2* | 4/2016 | Maeda | F21V 29/00 |
| 2006/0290840 | A1* | 12/2006 | Bang | G02F 1/133603 349/69 |
| 2007/0052663 | A1* | 3/2007 | Kim | G02F 1/133605 345/102 |

(Continued)

FOREIGN PATENT DOCUMENTS

KR  20110125518 A  11/2011
KR  20130126396 A  11/2013

*Primary Examiner* — Jia Pan
(74) *Attorney, Agent, or Firm* — Cantor Colburn LLP

(57) ABSTRACT
A liquid crystal display device includes a display panel which displays an image, an accommodating frame in which the display panel is accommodated, the accommodating frame including a bottom portion, a plurality of light source units arranged in a matrix form on the bottom portion, and a plurality of partitions dividing the plurality of light source units based on a row or column direction, wherein each of the plurality of light source units includes a plurality of light sources having different wavelengths, and the partition is spaced apart from the display panel and the bottom portion.

20 Claims, 3 Drawing Sheets

(56) References Cited

U.S. PATENT DOCUMENTS

| | | | | |
|---|---|---|---|---|
| 2011/0279754 A1* | 11/2011 | Park | ............ | G02F 1/133606 |
| | | | | 349/69 |
| 2013/0050587 A1* | 2/2013 | Namekata | ......... | G02F 1/133603 |
| | | | | 348/739 |
| 2013/0300771 A1* | 11/2013 | Cho | ............ | G09G 5/026 |
| | | | | 345/690 |
| 2014/0268634 A1* | 9/2014 | Kang | ............ | G09G 3/2025 |
| | | | | 362/84 |
| 2015/0116378 A1* | 4/2015 | Cho | ............ | G09G 3/3413 |
| | | | | 345/691 |

* cited by examiner

LIQUID CRYSTAL DISPLAY DEVICE

This application claims priority to Korean Patent Application No. 10-2015-0081820, filed on Jun. 10, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device, and more particularly, to an LCD device including a light source unit alternately outputting a plurality of primary color lights.

2. Description of the Related Art

A liquid crystal display ("LCD") device is a type of flat panel display ("FPD") devices that have gained wide acceptance recently. An LCD device generally includes two substrates having electrodes formed thereon and a liquid crystal layer interposed between the two substrates. In such an LCD device, orientations of liquid crystal molecules of the liquid crystal layer are rearranged by voltages that are applied to the electrodes, thereby adjusting the amount of transmitted light and displaying an image on the LCD device.

An LCD device includes a display panel displaying an image and a backlight unit ("BLU") supplying light to the display panel. A BLU is classified into a direct-type BLU, an edge-type BLU, a corner-type BLU, and the like, based on a position of a light source within the BLU.

An edge-type BLU includes a light guide plate and light sources on a side of the light guide plate. Light emitted laterally from the light source is irradiated to a display panel through the light guide plate. Since a direct-type BLU includes a plurality of light sources below a display panel, the direct-type BLU may have advantages in that luminance may be enhanced and an area of a light emitting surface may be increased, when compared to the edge-type BLU.

In general, the light source outputs a white light using a white light source, or outputs a white light by simultaneously emitting red, green, and blue lights respectively from the red, green, and blue lights sources.

SUMMARY

Red, green, and blue color filters of the display panel selectively transmit a white light to thereby provide a desired color. However, in this case, the light source needs to supply a greater amount of white lights than an amount of primary color lights that are actually transmitted through the display panel, thus resulting in increased power consumption.

Accordingly, there are attempts to reduce power consumption by alternately outputting a plurality of primary color lights. However, in this case, a color mixing phenomenon of lights may occur due to the plurality of primary color lights being alternately output.

Exemplary embodiments of embodiments of the invention are directed to a liquid crystal display ("LCD") device including a light source unit alternately outputting a plurality of primary color lights, reduced in a color mixing phenomenon of lights.

According to an exemplary embodiment of the invention, a liquid crystal display device includes a display panel displaying an image, an accommodating frame in which the display panel is accommodated, the accommodating frame including a bottom portion, a plurality of light source units arranged in a matrix form on the bottom portion, and a plurality of partitions dividing the plurality of light source units based on a row or column direction, wherein each of the light source units includes a plurality of light sources having different wavelengths, and the partition is spaced apart from the display panel and the bottom portion.

In an exemplary embodiment, an interval between the display panel and the partition may be in a range of about 10 percent (%) to about 30% of an interval between the display panel and the bottom portion.

In an exemplary embodiment, an interval between the bottom portion and the partition may be in a range of about 10% to about 30% of an interval between the display panel and the bottom portion.

In an exemplary embodiment, the liquid crystal display device may further include at least one optical sheet between the display panel and the light source unit, wherein the partition is spaced apart from the optical sheet.

In an exemplary embodiment, the liquid crystal display device may further include at least one reflective sheet between the light source unit and the bottom portion, wherein the partition is spaced apart from the at least one reflective sheet.

In an exemplary embodiment, an interval between the at least one optical sheet and the partition may be in a range of about 10% to about 30% of an interval between the at least one optical sheet and the at least one reflective sheet.

In an exemplary embodiment, an interval between the at least one reflective sheet and the partition may be in a range of about 10% to about 30% of an interval between the at least one optical sheet and the at least one reflective sheet.

In an exemplary embodiment, the partition may include at least one of aluminum (Al), silver (Ag), gold (Au), titanium oxide, aluminum paste, aluminum powder, silicon oxide, aluminum oxide, zirconium oxide, magnesium fluoride, barium sulfate, and calcium carbonate.

In an exemplary embodiment, the partition may further include a supporting portion for maintaining a predetermined interval between the partition and the bottom portion.

In an exemplary embodiment, the partition may further include a supporting portion for maintaining a predetermined interval between the partition and the at least one reflective sheet.

In an exemplary embodiment, the partition may have an unevenness pattern on at least one of an upper end and a lower end thereof.

In an exemplary embodiment, protruding portions of unevenness patterns respectively disposed on adjacent partitions may be alternately disposed.

In an exemplary embodiment, the display panel may include a first color filter having a first primary color, a second color filter having a second primary color, and a transparent filter.

In an exemplary embodiment, the light source unit may include a first light source outputting a light having a mixed color of the first primary color and the second primary color, and a second light source outputting a light having a third primary color.

In an exemplary embodiment, the mixed color may be yellow, and the third primary color may be blue.

In an exemplary embodiment, the mixed color may be magenta, and the third primary color may be green.

In an exemplary embodiment, the mixed color may be cyan, and the third primary color may be red.

In an exemplary embodiment, the first light source and the second light source may alternately output light.

In an exemplary embodiment, the display panel may display an image at a frequency of about 120 hertz (Hz), and the first light source and the second light source may alternately output light at a frequency of about 120 Hz.

In an exemplary embodiment, the display panel may display a left-eye image and a right-eye image at a frequency of about 120 Hz, and the first light source and the second light source may alternately output light at a frequency of about 240 Hz.

The foregoing is illustrative only and is not intended to be in any way limiting. In addition to the illustrative exemplary embodiments, embodiments, and features described above, further exemplary embodiments, embodiments, and features will become apparent by reference to the drawings and the following detailed description.

BRIEF DESCRIPTION OF THE DRAWINGS

The above and other features and exemplary embodiments of the invention of invention will be more clearly understood from the following detailed description taken in conjunction with the accompanying drawings, in which.

DETAILED DESCRIPTION

Figure 1:
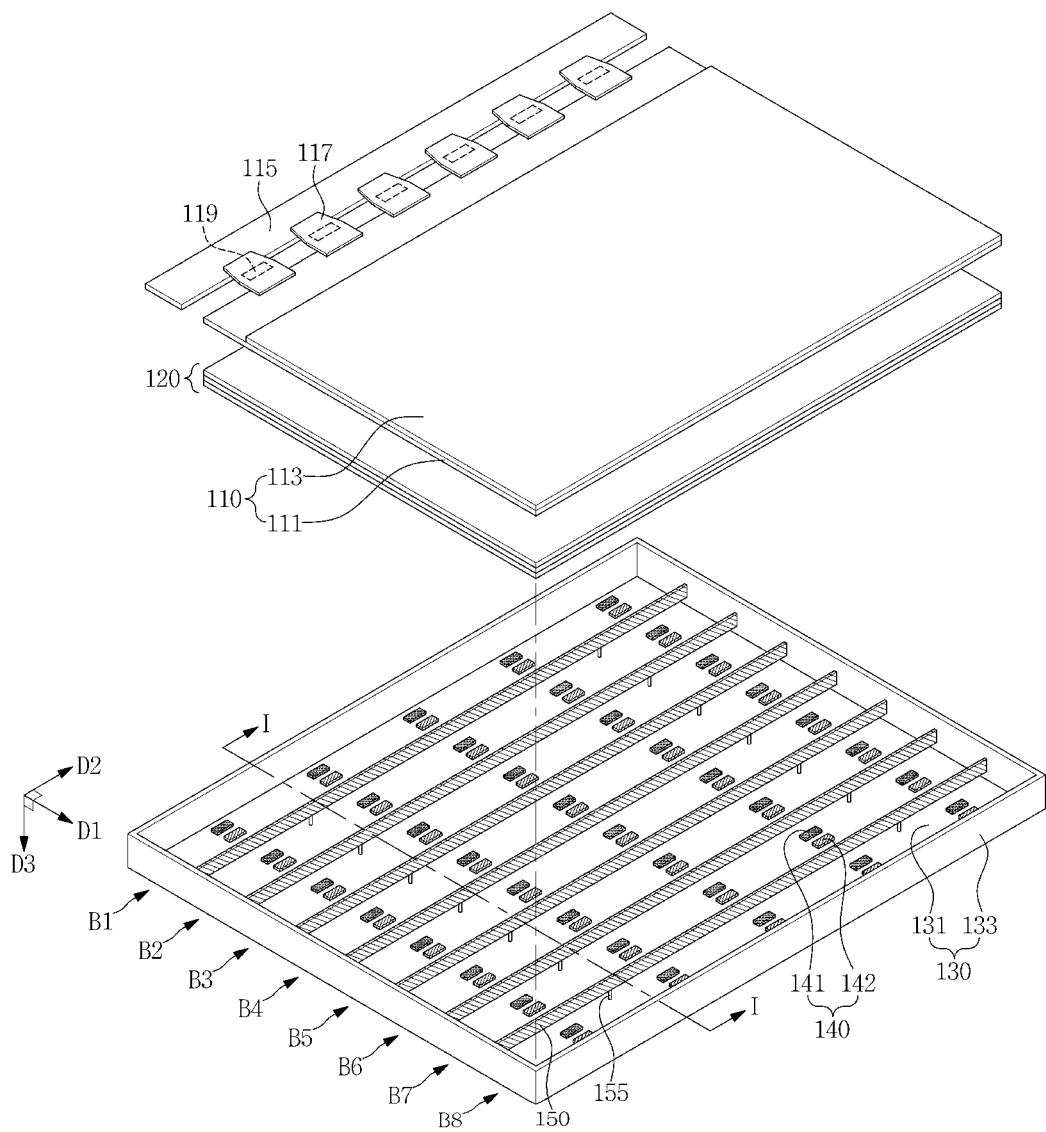
FIG. 1 is an exploded perspective view illustrating an exemplary embodiment of a liquid crystal display ("LCD") device according to the invention.

Exemplary embodiments will now be described more fully hereinafter with reference to the accompanying drawings.

Although the invention can be modified in various manners and have several embodiments, specific embodiments are illustrated in the accompanying drawings and will be mainly described in the specification. However, the scope of the embodiments of the invention is not limited to the specific embodiments and should be construed as including all the changes, equivalents, and substitutions included in the spirit and scope of the invention.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first", "second", and the like, may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

When it is determined that a detailed description may make the purpose of the invention unnecessarily ambiguous in the description of the invention, such a detailed description will be omitted. In addition, the same components and corresponding components are given the same reference numeral.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of a display device according to the invention are explained with respect to a liquid crystal display ("LCD") device including a direct-type backlight unit in which a plurality of light sources are disposed below a display panel, but the invention is not limited thereto.

Figure 2:
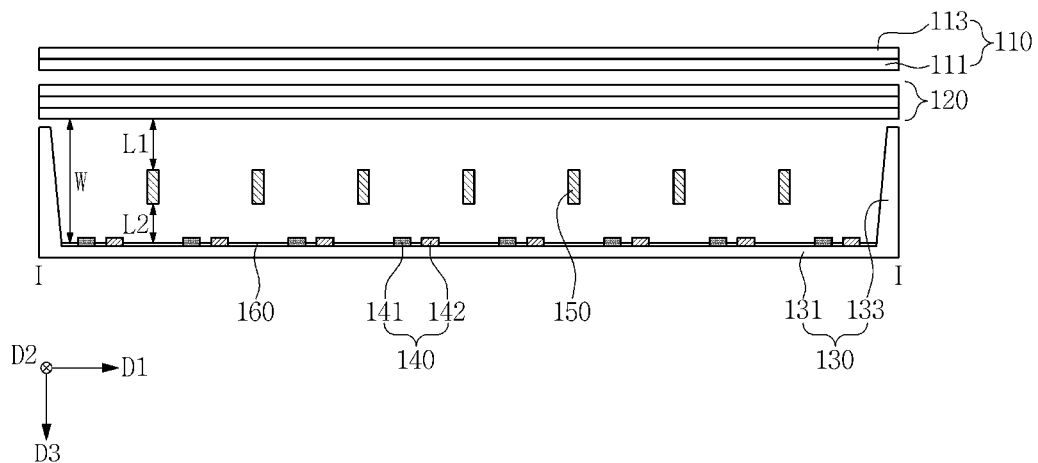
FIG. 2 is a cross-sectional view taken along section line I-I of FIG. 1.

FIG. 1 is an exploded perspective view illustrating an LCD device according to an exemplary embodiment. FIG. 2 is a cross-sectional view taken along section line I-I of FIG. 1.

Referring to FIGS. 1 and 2, the LCD device according to the exemplary embodiment includes a display panel 110, an optical sheet 120, an accommodating frame 130, a light source unit 140, a partition 150, and a reflective sheet 160.

As used herein, the optical sheet 120, the accommodating frame 130, the light source unit 140, the partition 150, and the reflective sheet 160 are collectively referred to as a backlight unit.

The display panel 110 may include a first substrate 111, a second substrate 113 opposing the first substrate 111, and a liquid crystal layer (not illustrated) between the first and second substrates 111 and 113.

The first substrate 111 includes a plurality of pixel electrodes arranged in a matrix form, a thin film transistor applying a driving voltage to each of the pixel electrodes, and various signal lines for driving the pixel electrode and the thin film transistor.

The second substrate 113 is disposed to oppose the first substrate 111, and includes a common electrode including a transparent conductive material, a first color filter having a first primary color, a second color filter having a second primary color, and a transparent filter.

The first color filter and the second color filter according to the exemplary embodiment may include at least two color filters included in a red color filter, a green color filter, and a blue color filter. However, the invention is not limited thereto, and the at least two color filters may be included in various other color filters.

The liquid crystal layer (not illustrated) is interposed between the first and second substrates 111 and 113, and is rearranged by an electric field generated between the pixel electrode and the common electrode. The rearranged liquid crystal layer adjusts a level of transmittance of light emitted from the backlight unit, the light having the adjusted level of transmittance is transmitted through the color filter and the transparent filter, and an image is displayed outwardly.

In addition, polarizers (not illustrated) may further be disposed on a lower surface of the first substrate 111 and an upper surface of the second substrate 113, respectively. The polarizers may each have a planar area corresponding to a planar area of the display panel 110 in size. The polarizers may transmit a predetermined component of polarized light from among the light emitted from the backlight unit or may transmit a predetermined component of polarized light from among externally supplied light, and may absorb or block the remainder of the light emitted from the backlight unit or the remainder of the externally supplied light.

A driving circuit board 115 may be disposed laterally and face at least one side of the display panel 110. The driving circuit board 115 may supply various control signals and power signals for driving the display panel 110.

In an exemplary embodiment, the display panel 110 and the driving circuit board 115 may be electrically connected to one another by at least one flexible printed circuit board ("FPCB") 117. In the exemplary embodiment, the FPCB 117 may be a chip-on-film ("COF") or a tape-carrier-package ("TCP"), and the number of FPCBs 117 may vary based on, for example, a size and a driving scheme, of the display panel 110. However, the invention is not limited thereto, and the driving circuit board 115 may be electrically connected to one another by various other types of circuit boards.

A driving chip 119 may be disposed (e.g., mounted) on the FPCB 117. The driving chip 119 may generate various driving signals for driving the display panel 110. In exemplary embodiments, the driving chip 119 may be a single chip in which a timing controller and a data driving circuit are integrated with one another, and may be referred to as, for example, a driver integrated circuit ("IC") or a source integrated circuit ("IC").

The optical sheet 120 is interposed between the light source unit 140 and the display panel 110, and may serve to diffuse or collimate light transmitted from the light source unit 140.

The optical sheet 120 includes a diffusion sheet, a prism sheet, and a protective sheet.

The diffusion sheet may serve to disperse a light incident thereon from the light source unit 140 so as to prevent a partial concentration of the light.

In an exemplary embodiment, the prism sheet may include, on a surface thereof, prisms having a triangular cross-section and provided in a predetermined array. However, the invention is not limited thereto, and the prisms may have various other cross-section shapes. The prism sheet may be disposed on the diffusion sheet to collimate light diffused from the diffusion sheet in a direction perpendicular with respect to the display panel 110.

The protective sheet may be disposed on the prism sheet, may protect a surface of the prism sheet, and may diffuse light in order to achieve uniform light distribution.

In an exemplary embodiment, the accommodating frame 130 may include, for example, stainless steel, or a material having a high heat dissipation property such as aluminum (Al) or an Al alloy. The accommodating frame 130 includes a bottom portion 131, and a side wall portion 133 bent from the bottom portion 131 to extend therefrom.

The accommodating frame 130 supports the display panel 110, and protects components accommodated therein, such as, for example, the optical sheet 120, the light source unit 140, the partition 150, and the reflective sheet 160.

The plurality of light source units 140 may be arranged in a matrix form on the bottom portion 131 of the accommodating frame 130. The number of the light source units 140 may vary based on various factors such as a size, luminance uniformity, and the like, of the display panel 110.

The light source unit 140 may include a first light source 141 outputting a light having a mixed color of the first primary color and the second primary color, and a second light source 142 outputting a light having a third primary color. In an exemplary embodiment, each of the first light source 141 and the second light source 142 may include a light emitting diode ("LED") chip and/or a package (not illustrated) accommodating the LED chip. However, the invention is not limited thereto, and each of the first light source 141 and the second light source 142 may include various other types of light sources.

According to the exemplary embodiment, the first, second, and third primary colors correspond to red, green, and blue, respectively, for example. Accordingly, the display panel 110 according to the exemplary embodiment may include a red color filter, a green color filter, and a transparent filter. The first light source 141 may output a light having a yellow color which is a mixed color of the first primary color (e.g., red) and the second primary color (e.g., green). The second light source 142 may output a light having a blue color which is the third primary color.

In addition, according to another exemplary embodiment, the first, second, and third primary colors correspond to red, blue, and green, respectively, for example. Accordingly, the display panel 110 according to the exemplary embodiment may include a red color filter, a blue color filter, and a transparent filter. The first light source 141 may output a light having a magenta color which is a mixed color of the first primary color (e.g., red) and the second primary color (e.g., blue). The second light source 142 may output a light having a green color which is the third primary color.

Further, according to another exemplary embodiment, the first, second, and third primary colors correspond to green, blue, and red, respectively, for example. Accordingly, the display panel 110 according to the still another exemplary embodiment may include a green color filter, a blue color filter, and a transparent filter. The first light source 141 may output a light having a cyan color which is a mixed color of the first primary color (e.g., green) and the second primary color (e.g., blue). The second light source 142 may output a light having a red color which is the third primary color.

The first light source 141 and the second light source 142 may alternately output light.

In an exemplary embodiment, in a case in which the display panel 110 displays an image at a frequency of about 120 hertz (Hz), the first light source 141 and the second light source 142 may alternately output light at a frequency of about 120 Hz, for example. In addition, in a case in which the display panel 110 displays a left-eye image and a right-eye image at a frequency of about 120 Hz, the first light source 141 and the second light source 142 may alternately output light at a frequency of about 240 Hz.

The plurality of partitions 150 may be disposed between the optical sheet 120 and the bottom portion 131 of the accommodating frame 130, and may partition the plurality of light source units 140 arranged in a matrix form based on a row or column direction. Hereinafter, each group of the plurality of light source units 140 partitioned by the partitions 150 is referred to as a light source block.

The LCD device according to the exemplary embodiment may include first to eighth light source blocks B1 to B8 partitioned in a first direction D1. However, the number of the light source blocks is not limited thereto.

Figure 3:
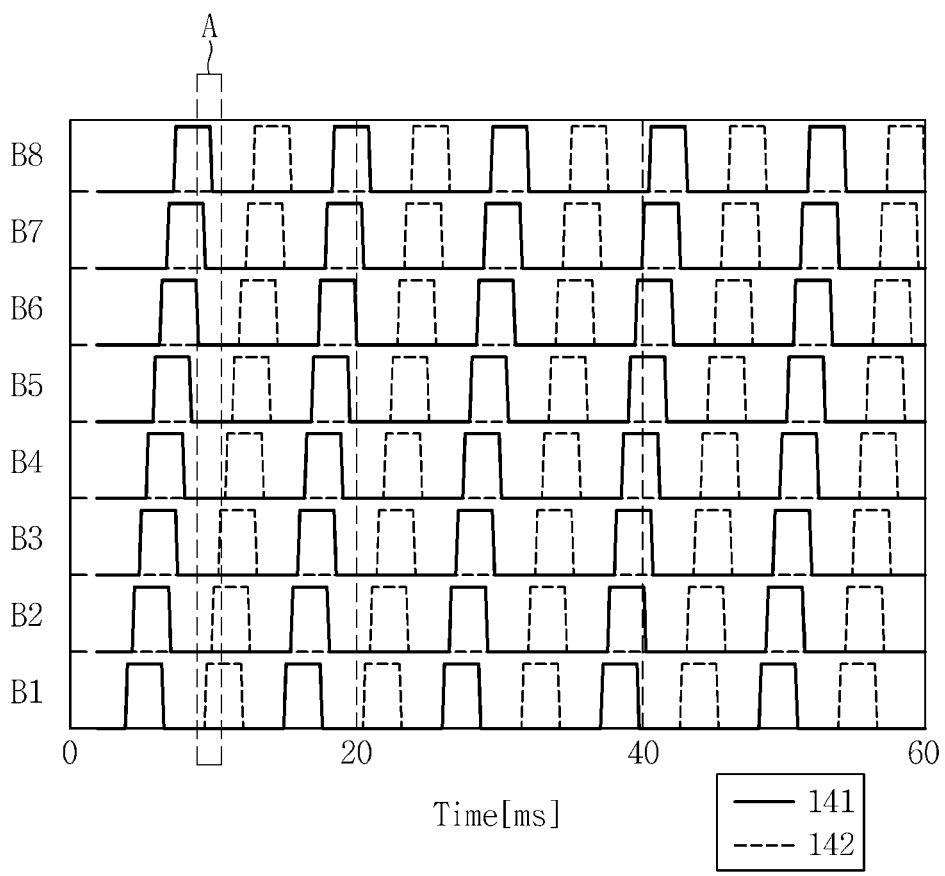
FIG. 3 is a driving timing view of an exemplary embodiment of light source blocks according to the invention.

FIG. 3 is a driving timing view of the first to eighth light source blocks B1 to B8 according to the exemplary embodiment.

Referring to FIGS. 1, 2, and 3, the first to eighth light source blocks B1 to B8 according to the exemplary embodiment may be sequentially turned on. The light source unit 140 included in each of the first to eighth light source blocks B1 to B8 has the first light source 141 and the second light source 142 that are alternately turned on.

However, since the first to eighth light source blocks B1 to B8 are not simultaneously turned on, when the second light source 142 of the first light source block B1 is turned on, the first light source 141 of the eighth light source block B8 may be turned on in a time period A shown in FIG. 3, for example.

Consequently, a color mixing phenomenon of a light of the first light source 141 and a light of the second light source 142 may occur. In an exemplary embodiment, in a case in which the first light source 141 outputs a yellow light and the second light source 142 outputs a blue light, the yellow light and the blue light may be mixed, such that display quality may be deteriorated, for example.

In this regard, in the exemplary embodiment, each of the partitions 150 is disposed between adjacent ones of the first to eighth light source blocks B1 to B8, to thereby prevent a color mixing phenomenon in which lights are mixed between adjacent ones of the first to eighth light source blocks B1 to B8.

Referring to FIG. 2, the partition 150 may be spaced apart from the display panel 110 and from the bottom portion 131 of the accommodating frame 130, at predetermined intervals. In an exemplary embodiment, an interval between the display panel 110 and the partition 150 may be in a range of about 10 percent (%) to about 30% of an interval between the display panel 110 and the bottom portion 131, for example. Similarly, in an exemplary embodiment, an interval between the bottom portion 131 and the partition 150 may be in a range of about 10% to about 30% of the interval between the display panel 110 and the bottom portion 131, for example.

In a case in which the optical sheet 120 is disposed below the display panel 110 and the reflective sheet 160 is further disposed on the bottom portion 131, an interval L1 between the optical sheet 120 and the partition 150 may be in a range of about 10% to about 30% of an interval W between the optical sheet 120 and the reflective sheet 160. An interval L2 between the reflective sheet 160 and the partition 150 may be in a range of about 10% to about 30% of the interval W between the optical sheet 120 and the reflective sheet 160.

In the LCD device according to the exemplary embodiment, the partition 150 is disposed to be spaced apart from the display panel 110, the optical sheet 120, the reflective sheet 160, the accommodating frame 130, and the like, thereby enhancing display quality.

In an exemplary embodiment, the partition 150 may include at least one of aluminum (Al), silver (Ag), gold (Au), titanium oxide, aluminum paste, aluminum powder, silicon oxide, aluminum oxide, zirconium oxide, magnesium fluoride, barium sulfate, and calcium carbonate, for example.

In addition, the partition 150 may further include a supporting portion 155 for maintaining a predetermined interval between the partition 150 and the bottom portion 131 and between the partition 150 and the reflective sheet 160, and the like.

Figure 4:
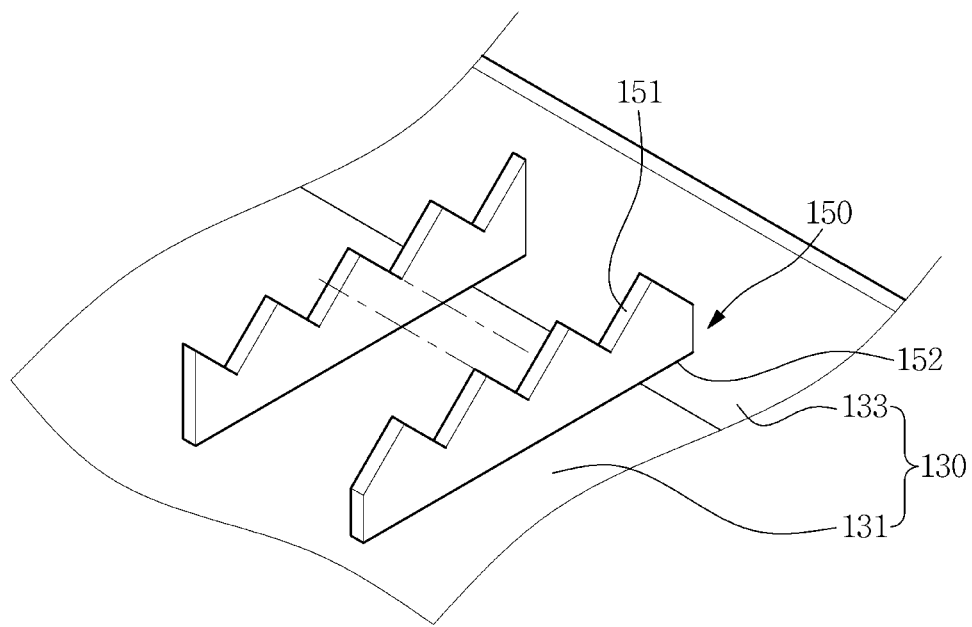
FIGS. 4 and 5 are perspective views illustrating other exemplary embodiments of partitions according to the invention, respectively.
Figure 5:
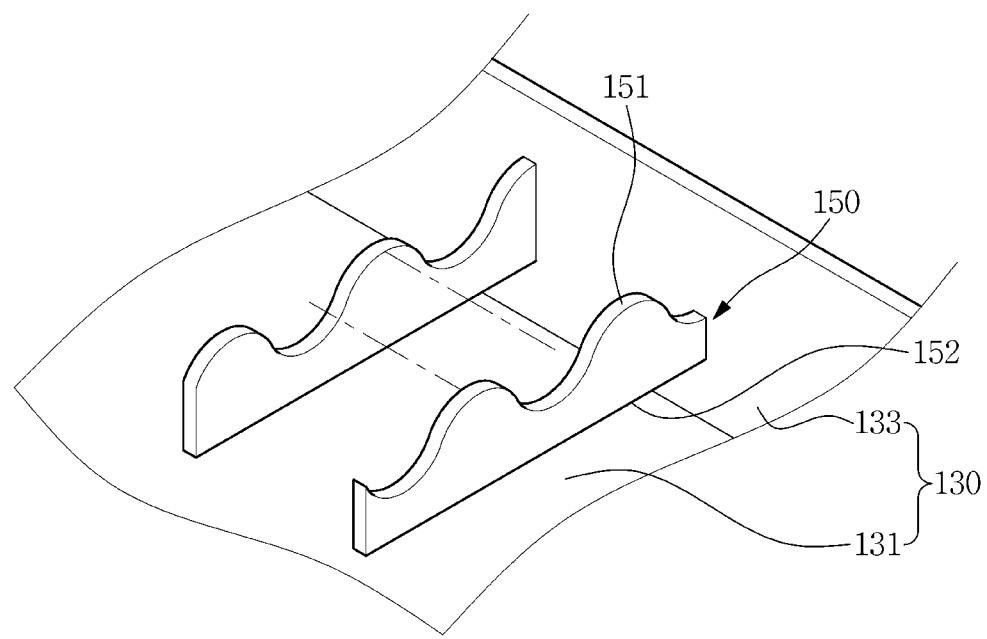

FIGS. 4 and 5 are perspective views illustrating partitions 150 according to other exemplary embodiments, respectively.

Referring to FIGS. 4, and 5, each of the partitions 150 according to the other exemplary embodiments may include an unevenness pattern on at least one of an upper end 151 and a lower end 152 thereof. The unevenness pattern may have a sawtooth shape (refer to FIG. 4) or a curved shape (refer to FIG. 5). In addition, protruding portions of unevenness patterns respectively disposed on adjacent partitions 150 may be alternately disposed so as not to overlap one another.

As set forth above, according to one or more exemplary embodiments, the LCD device may reduce the color mixing phenomenon of lights by allowing the partition to be disposed at a boundary between adjacent light source units.

In addition, display quality may be enhanced by allowing the partition to be spaced apart from the accommodating frame in which the display panel and the light source unit are accommodated.

From the foregoing, it will be appreciated that various embodiments in accordance with the invention have been described herein for purposes of illustration, and that various modifications may be made without departing from the scope and spirit of the teachings. Accordingly, the various exemplary embodiments disclosed herein are not intended to be limiting of the true scope and spirit of the teachings.

Various features of the above described and other exemplary embodiments can be mixed and matched in any manner, to produce further exemplary embodiments consistent with the invention.

What is claimed is:

1. A liquid crystal display device comprising:
   a display panel which displays an image;
   an accommodating frame in which the display panel is accommodated, the accommodating frame comprising a bottom portion;
   a plurality of light source units arranged in a matrix form on the bottom portion; and
   a plurality of partitions dividing the plurality of light source units based on a row or column direction,
   wherein each of the plurality of light source units comprises a plurality of light sources having different wavelengths from each other, and
   a partition of the plurality of partitions is spaced apart from a light exit surface defining the plurality of light source units in a vertical direction parallel to a direction of the partition of the plurality of partitions being spaced apart from the display panel and the bottom portion.

2. The liquid crystal display device of claim 1, wherein an interval between the display panel and the partition is in a range of about 10 percent to about 30 percent of an interval between the display panel and the bottom portion.

3. The liquid crystal display device of claim 1, wherein an interval between the bottom portion and the partition is in a range of about 10 percent to about 30 percent of an interval between the display panel and the bottom portion.

4. The liquid crystal display device of claim 1, further comprising at least one optical sheet between the display panel and the light source unit,
   wherein the partition is spaced apart from the optical sheet.

5. The liquid crystal display device of claim 1, wherein the partition comprises at least one of aluminum (Al), silver (Ag), gold (Au), titanium oxide, aluminum paste, aluminum powder, silicon oxide, aluminum oxide, zirconium oxide, magnesium fluoride, barium sulfate, and calcium carbonate.

6. The liquid crystal display device of claim 1, wherein the partition comprises a supporting portion which maintains a predetermined interval between the partition and the bottom portion.

7. The liquid crystal display device of claim 1, wherein the partition has an unevenness pattern on at least one of an upper end and a lower end thereof.

8. The liquid crystal display device of claim 7, wherein protruding portions of unevenness patterns respectively disposed on adjacent partitions of the plurality of partitions are alternately disposed.

9. The liquid crystal display device of claim 1, wherein the display panel comprises:
   a first color filter having a first primary color;
   a second color filter having a second primary color; and
   a transparent filter.

10. The liquid crystal display device of claim 9, wherein the light source unit comprises:
    a first light source which outputs a light having a mixed color of the first primary color and the second primary color; and
    a second light source which outputs a light having a third primary color.

11. The liquid crystal display device of claim 10, wherein the mixed color is yellow, and the third primary color is blue.

12. The liquid crystal display device of claim 10, wherein the mixed color is magenta, and the third primary color is green.

13. The liquid crystal display device of claim 10, wherein the mixed color is cyan, and the third primary color is red.

14. The liquid crystal display device of claim 10, wherein the first light source and the second light source alternately output light.

15. The liquid crystal display device of claim 10, wherein the display panel displays an image at a frequency of about 120 hertz, and the first light source and the second light source alternately output light at a frequency of about 120 hertz.

16. The liquid crystal display device of claim 10, wherein the display panel displays a left-eye image and a right-eye image at a frequency of about 120 hertz, and the first light source and the second light source alternately output light at a frequency of about 240 hertz.

17. A liquid crystal display device comprising: a display panel which displays an image;
    an accommodating frame in which the display panel is accommodated, the accommodating frame comprising a bottom portion;
    a plurality of light source units arranged in a matrix form on the bottom portion; and
    a plurality of partitions dividing the plurality of light source units based on a row or column direction,
    wherein each of the plurality of light source units comprises a plurality of light sources having different wavelengths from each other,
    a partition of the plurality of partitions is spaced apart from a light exit surface defining the plurality of light source units in a vertical direction parallel to a direction of the partition of the plurality of partitions being spaced apart from the display panel and the bottom portion,
    at least one reflective sheet between the partition and the bottom portion, and
    wherein the partition is spaced apart from the at least one reflective sheet.

18. The liquid crystal display device of claim 17, wherein an interval between the at least one optical sheet and the partition is in a range of about 10 percent to about 30 percent of an interval between the at least one optical sheet and the at least one reflective sheet.

19. The liquid crystal display device of claim 17, wherein an interval between the at least one reflective sheet and the partition is in a range of about 10 percent to about 30 percent of an interval between the at least one optical sheet and the at least one reflective sheet.

20. The liquid crystal display device of claim 17, wherein the partition further comprises a supporting portion which maintains a predetermined interval between the partition and the at least one reflective sheet.

* * * * *